(12) United States Patent
Hokkirigawa et al.

(10) Patent No.: US 6,821,433 B2
(45) Date of Patent: Nov. 23, 2004

(54) WATER PURIFICATION METHOD

(75) Inventors: Kazuo Hokkirigawa, Yonezawa (JP); Motoharu Akiyama, Nagano-ken (JP); Noriyuki Yoshimura, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/793,258

(22) Filed: Mar. 4, 2004

(65) Prior Publication Data

US 2004/0168984 A1 Sep. 2, 2004

Related U.S. Application Data

(62) Division of application No. 10/154,771, filed on May 24, 2002, now abandoned.

(30) Foreign Application Priority Data

May 25, 2001 (JP) ........................................ 2001-157546

(51) Int. Cl.$^7$ ................................................. C02F 1/28
(52) U.S. Cl. ........................ 210/660; 210/694; 210/767; 210/806; 210/266; 210/315; 210/496; 210/497.01; 210/502.1; 210/507; 210/510.1
(58) Field of Search ................................. 210/660, 679, 210/694, 767, 806, 807, 266, 315, 496, 497.01, 502.1, 506, 507, 510.1

(56) References Cited

U.S. PATENT DOCUMENTS 5,679,248 A * 10/1997 Blaney ........................ 210/315

OTHER PUBLICATIONS

Article: Development of Hard and Porous Carbon Material "RB Ceramics" Using Rice Bran as a Starting Material; (Translation from "Zairyou kagaku", vol. 17, No. 6, pp. 24 to 27, May 1997); Kazuo Hokkirigawa; 10 pages.*

* cited by examiner

Primary Examiner—Ivars C. Cintins
(74) Attorney, Agent, or Firm—Flynn, Thiel, Boutell & Tanis, P.C.

(57) ABSTRACT

This is provided a water purification method using a filter capable of being molded into free shapes in which RB ceramics and/or CRB ceramics of 10 to 2,000 angstroms in pore diameter and 0.1 to 1.1 cm$^3$/g in pore volume are used as an absorption and filtration material.

9 Claims, 3 Drawing Sheets

WATER PURIFICATION METHOD

This application is a divisional of U.S. Ser. No. 10/154,771, filed May 24, 2002, now abandoned.

FIELD OF THE INVENTION

This invention relates to a water purification method using a filter for filtering water, especially for filtering tap water, industrial water, river water and waste water.

BACKGROUND OF THE INVENTION

Conventional water purification filters comprise polyolefin or polyester fabric or felt, or dry or wet non-woven fabric or felt, span-bonded non-woven fabric or felt, equivalents thereof and active carbon materials or zeolite supported between the fabric or non-woven fabric or felt.

For example, Japanese Patent Nos. A-H07-26,460, A-H08-24,535, and A-H07-207,566 describe a filter material which is relatively cheap and makes it possible to reduce the critical particle diameter of filtration by laminating and gluing melt-blown non-woven fabric or felt and span-bonded non-woven fabric or felt.

In any case of conventional water purification filters, it is necessary to form non-woven fabric or felt into a specific shape and support zeolite or active carbon thereon.

The inventors have found that a water purification filter itself can be formed by simply applying RB ceramics and/or CRB ceramics as a moldable carbon material, thereby the present invention being developed.

SUMMARY OF THE INVENTION

Accordingly, it is an object of the present invention to provide a water purification method using a filter which is directly molded from RB ceramics and/or CRB ceramics.

A further object of the present invention is to provide a water purification method using a filter in which a fine powder of RB ceramics and/or CRB ceramics is supported on non-woven fabric or felt.

According to the present invention, RB ceramics and/or CRB ceramics of 10 to 2,000 angstroms in pore diameter and 0.1 to 1.1 $cm^3/g$ in pore volume are used as a filter material of a water purification filter.

PREFERRED EMBODIMENTS OF THE INVENTION

A RB ceramics and/or CRB ceramics material applied to a water purification filter of the present invention is prepared from a defatted product of rice bran as a main raw material and a thermosetting resin.

It is known that Dr. Kazuo Hokkirigawa, the first inventor of the present invention, proposed an idea to obtain a porous carbon material by the use of rice bran which is by-produced in an amount of 0.9 million ton/year in Japan or 3–3 million ton/year in the world (see, Kinou Zairyou, Vol. 17, No. 5, pp. 24 to 28, May 1997).

The above mentioned literature describes a carbon material or so-called RB ceramics made by mixing and kneading a defatted product of rice bran and a thermosetting resin, press-molding the mixture to form a molded material, followed by drying and then baking the dried material in an atmosphere of inert gas.

Defatted rice bran used in the present invention is not limited to a specific species of rice and may either be a product of Japan or foreign countries.

A thermosetting resin used herein may also be any resin which can be thermally set and typically includes phenol-, diarylphthalate-, unsaturated polyester-, epoxy-, polyimide- and triazine resins, although a phenol resin is preferably used.

A thermoplastic resin such as polyamide may also be used together without departing from the scope of the present invention.

A mixing ratio of the defatted rice bran to the thermosetting resin is in the range of 50 to 90:50 to 10 and preferably 70 to 80:30 to 20 by weight.

According to the above mentioned method, the difference in ratio of shrinkage between the press-molded material and the finally molded material which is baked in an atmosphere of inert gas reached almost 25%. Such a difference made it substantially difficult to form a precisely molded material, but has been finally improved as a result of development of CRB ceramics.

CRB ceramics used in the present invention is an improved material of RB ceramics obtained from defatted rice bran and a thermosetting resin and is prepared by mixing and kneading both of these materials and primarily baking the mixture in an inert gas at 700 to 1,000° C., followed by grinding to form a carbonized powder of about 60 mesh or less, which is then mixed and kneaded with the thermosetting resin to yield a mixture (hereinafter referred to as a CRB precursor), press-molded at a pressure of 20 to 30 Mpa and further heat-treating the thus molded material in an atmosphere of inert gas at 500 to 1,000° C. to form a molded product.

CRB ceramics is a porous material having innumerable pores. These pores formed in CRB ceramics can be classified into three kinds of types depending on a formation process thereof.

Figure 1A:
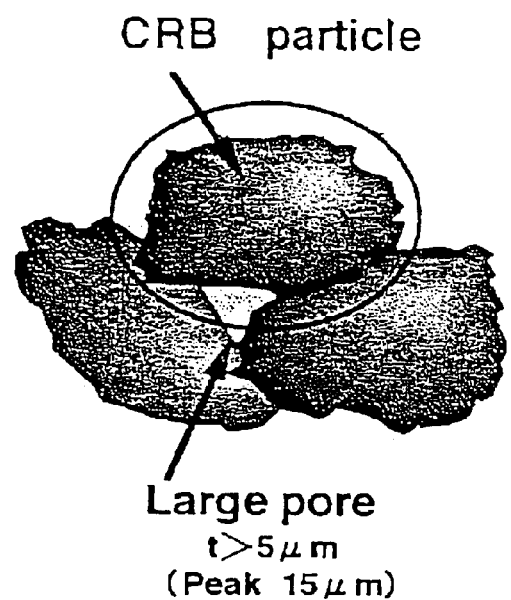
FIG. 1a is an illustration of a relatively large pore of CRB ceramics.

A pore shown in FIG. 1(a) is a relatively large one having a pore diameter of 5 μm or more, which is formed as a space between CRB fine particles when they overlap each other. A peak pore value of this type is about 15 μm.

Figure 1B:
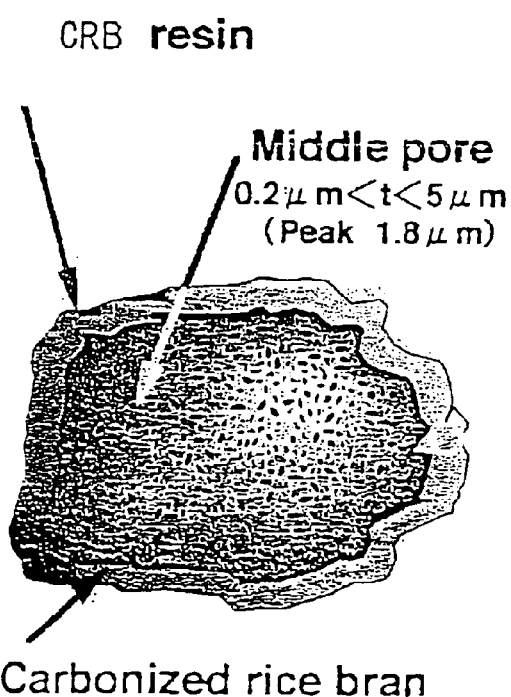
FIG. 1b is an illustration of pores of CRB ceramics caused by rice bran.

What is shown in FIG. 1(b) is a pore having a pore diameter of less than 5 μm which is formed by a fiber structure of rice bran. A peak pore value of this type is about 1.8 μm.

Figure 1C:
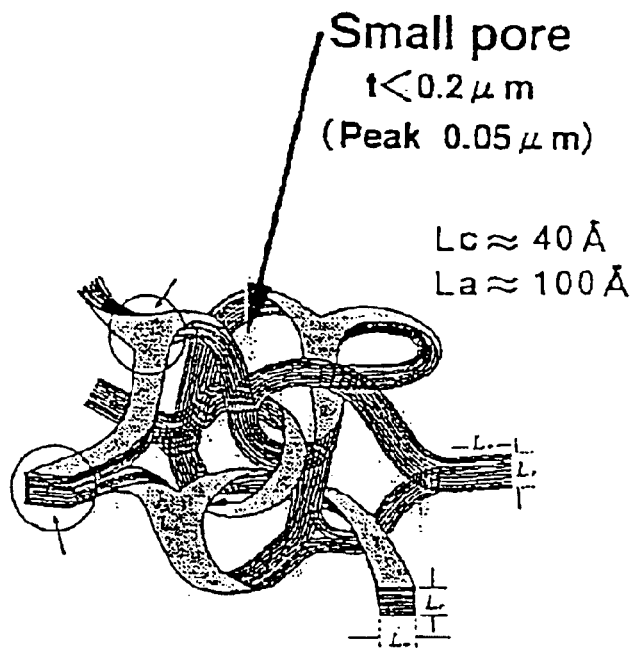
FIG. 1c is an illustration of pores of CRB ceramics caused by polymer chains.

A pore shown in FIG. 1(c) is a small one having a pore diameter of 0.2 μm or less which is formed as a space between molecular chains of a high molecular polymer such as a phenol resin when the polymer is carbonized at high temperatures. A peak pore value of this type is about 0.05 μm.

The thus formed three kinds of pores of CRB ceramics function as a filter for fine particles of various sizes corresponding to each pore diameter, respectively.

The most typical distinction of RB ceramics and CRB ceramics is that a difference in ratio of shrinkage between molded RB ceramics and a final product thereof is almost 25%, while that of CRB ceramics is so low as 3% or less, which makes the latter material much useful.

General properties of RB ceramics and CRB ceramics are as in the following:
extremely high hardness;
extremely small heat expansion coefficient;
porous structure;
electrical conductivity;
low specific gravity, light weighted;
improved abrasion resistance;
easiness of molding and mold making;
capable of being powdered; and
less negative effect to global environment and more resource conservation due to rice bran to be used as a starting material.

When a water purification filter is prepared directly from RB ceramics and/or CRB ceramics as a molded material, it is desirable to use CRB ceramics because of its precise moldability. However, even in the above mentioned case, RB ceramics should not be excluded from embodiments of the present invention, because it is possible to mold RB ceramics by means of a little bit larger mold, which is then reduced to a desired size through secondary processing.

The porosity of RB ceramics and/or CRB ceramics can be controlled by changing baking conditions, which is one of the characteristic features of these materials.

It is generally confirmed that the porosity is increased with an increase in heat-treating temperature.

When a water purification filter is prepared as a molded material directly from RB ceramics and/or CRB ceramics according to the present invention, the molded material desirably has a pore diameter of 10 to 2,000 angstroms and a pore volume of 0.1 to 1.1 $cm^3$ g.

When powdery RB ceramics are used in the present invention, it is not necessary to consider a difference in shrinkage between RB ceramics and CRB ceramics so that basically either of these materials may be used on an equal footing. The particle size of RB ceramics or CRB ceramics powder varies depending on the purpose to be used, although an average particle diameter of 1 to 500 $\mu$m is generally used.

Porosity is an important factor of the RB ceramics and/or CRB ceramics used in the present invention and is influenced by the primary baking temperature of the RB ceramics and by both the primary baking temperature and the secondary heat-treating temperature of CRB ceramics.

RB ceramics or CRB ceramics of optimum porosity can be yielded by primary baking or secondary heat treatment thereof at a temperature of 800 to 1,000° C.

When RB ceramics and/or CRB ceramics are used as a fine powder, non-woven fabric or felt is a suitable material to support the powder. A well-known carbon fine powder may be used together with the ceramics powder.

A ratio of the fine powder of RB ceramics and/or CRB ceramics to the carbon powder is desirably 50 to 90:50 to 10 by weight.

The fine powder of RB ceramics or CRB ceramics is hard, while its surface is quite rough, which characteristically increases maintaining properties thereof as a powdery material on a support and allows the powder to be hardly flown away by a fluid flow.

Further, there may be used inorganic materials such as glass wool and asbestos, synthetic polymers such as polyester and polyamide and natural materials such as cellulose, hemp and cotton as a fibrous material in the present invention.

It is required for non-woven fabric or felt used in the present invention to have properties of an average of 1 to 30 $\mu$m and maximum of 80 $\mu$m or less in pore diameter and pure water filtration discharge of $3 l/m^2$ ·min. or more at a differential pressure of 1 cm-$H_2O$. Non-woven fabric or felt having such properties is well-known and commercially available.

Embodiments of the present invention will be summarized as in the following.

1. A water purification method using a filter in which RB ceramics and/or CRB ceramics of 10 to 2,000 angstroms in pore diameter and 0.1 to 1.1 $cm^3/g$ in pore volume is used as an absorption and filtration material.
2. A water purification method using a filter described in the above item 1 in which RB ceramics and/or CRB ceramics is a filter molded into a cylindrical form. A water purification method using a filter described in the above item 2 comprising plural thin cylindrical filters fitted in order while altering a diameter of each cylinder.
3. A water purification method using a filter described in the above item 2 in which a zeolite fine powder or active carbon fine powder is filled between cylinders.
4. A water purification method using a filter described in the above item 1 in which RB ceramics and/or CRB ceramics is a filter molded into a solid cylinder form.
5. A water purification method using a filter in which a RB ceramics fine powder and/or CRB ceramics fine powder of 1 to 500 $\mu$m in an average particle diameter, 10 to 2,000 angstroms in pore diameter and 0.1 to 1.1 $cm^3/g$ in pore volume is supported on non-woven fabric.
6. A water purification method using a filter described in the above item 6 in which an active carbon fine powder is supported on nonwoven fabric in addition to RB ceramics fine powder and/or CRB fine powder.
8. A water purification method using a filter described in the above item 6 in which a ratio of a RB ceramics fine powder and/or CRB ceramics fine powder to a well-known active carbon fine powder is 50 to 90:50 to 10 by weight.
9. A water purification method using a filter described in either one of the above items 6 or 8 in which the non-woven fabric has the properties of an average of 1 to 30 $\mu$m and maximum of 80 $\mu$m or less in pore diameter and pure water filtration discharge of 3 $l/m^2$ ·min. or more at a differential pressure of 1 cm-$H_2O$.

It has been found that a water purification filter of the present invention can be molded into free shapes while keeping predetermined properties due to the use of RB ceramics and CRB ceramics. It has been also found that a fine powder of RB ceramics and CRB ceramics exhibits suitable properties as a water purification filter.

This invention will be further described in the following examples.

EXAMPLE 1

Preparation of CRB Ceramics Precursor

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The carbonated material thus baked was screened through a 300-mesh screen to form a carbonated powder of 50 to 80 μm in particle diameter.

Figure 2:
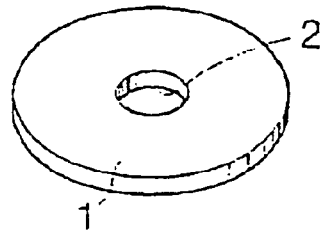
FIG. 2 is a perspective view of a disk-form water purification filter of the present invention.

The carbonated powder thus obtained in an amount of 75 kg and a solid phenol resin (resol) in an amount of 25 kg were mixed and kneaded by heating at 100 to 150° C. to form a plastic and homogeneous mixture as a plastic CRB ceramics precursor. Molding of a water purification filter Then, there was made a mold for molding a disk 1 of 20.0 cm in diameter and 1.5 cm in thickness as shown in FIG. 2, to which the plastic CRB ceramics precursor was pored and press-molded at a pressure of 25 Mpa. The mold temperature was 150° C.

The thus molded body was taken out of the mold die and subjected to a heat treatment by heating-up to 500° C. in a nitrogen atmosphere at a heat rising rate of 1° C. per minute and keeping at 500° C. for 60 minutes and then at 950° C. for about 120 minutes.

The molded body was then cooled at a cool down rate of 2 to 3° C. per minute down to 500° C., followed by natural heat dissipation under 500° C. to yield a molded product of CRB ceramics 1 as shown in FIG. 2.

Properties of the Water Purification Filter

The molded product of CRB ceramics 1 showed an average pore diameter of 350 angstroms and a pore volume of 0.65 cm$^3$/g.

EXAMPLE 2

Preparation of CRB Ceramics Precursor

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The carbonated material thus baked was screened through a 200-mesh screen to form a carbonated powder of 50 to 120 μm in particle diameter.

The carbonated powder thus obtained in an amount of 75 kg and a solid phenol resin (resol) in an amount of 25 kg were mixed and kneaded by heating at 100 to 150° C. to form a plastic and homogeneous mixture as a plastic CRB ceramics precursor.

Molding of a Water Purification Filter

Then, there was made a mold for molding a disk 1 of 20.0 cm in diameter and 1.5 cm in thickness as shown in FIG. 2, to which the plastic CRB ceramics precursor was poured and press-molded at a pressure of 25 Mpa. The mold temperature was 150° C.

The thus molded body was taken out of the mold die and subjected to a heat treatment by heating-up to 500° C. in a nitrogen atmosphere at a heat rising rate of 1° C. per minute and keeping at 500° C. for 60 minutes and then at 1,000° C. for about 150 minutes.

The molded body was then cooled at a cool down rate of 2 to 3° C. per minute down to 500° C., followed by natural heat dissipation under 500° C. to yield a molded product of CRB ceramics 2 as shown in FIG. 2.

Properties of the Water Purification Filter

The molded product of CRB ceramics 1 showed an average pore diameter of 450 angstroms and a pore volume of 0.52 cm$^3$/g.

EXAMPLE 3

Preparation of RB Ceramics Precursor

A defatted product of rice bran in an amount of 75 kg and a liquid phenol resin (resol) in an amount of 25 kg were mixed and kneaded by heating at 50 to 60° C. to form a plastic and homogeneous mixture.

Molding of a Water Purification Filter

Then, there was made a mold for molding a disk 1 of 20.0 cm in diameter and 1.5 cm of thickness as shown in FIG. 2, similarly as Example 1, to which the plastic CRB ceramics precursor was poured and press-molded at a pressure of 22 Mpa. The mold temperature was 170° C.

The thus molded body was taken out of the mold die and subjected to a heat treatment by heating-up to 500° C. in a nitrogen atmosphere at a heat rising rate of 1° C. per minute and keeping at 800° C. for 120 minutes. The molded body was then cooled at a cool down rate of 2 to 3° C. per minute down to 500° C., followed by natural heat dissipation under 500° C.

Properties of the Water Purification Filter

The molded product of CRB ceramics 1 showed an average pore diameter of 500 angstroms and a pore volume of 0.51 cm$^3$/g, although it shrank slightly.

EXAMPLE 4

Preparation of CRB Ceramics Precursor

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The carbonized material thus baked was screened through a 100-mesh screen to form a carbonized powder of 50 to 250μm in particle diameter.

The carbonized powder thus obtained in an amount of 78 kg and a solid phenol resin (resol) in an amount of 22 kg were mixed and kneaded by heating at 100 to 150° C. to form a plastic and homogeneous mixture as a plastic CRB ceramics precursor.

Molding of a Water Purification Filter

Figure 3:
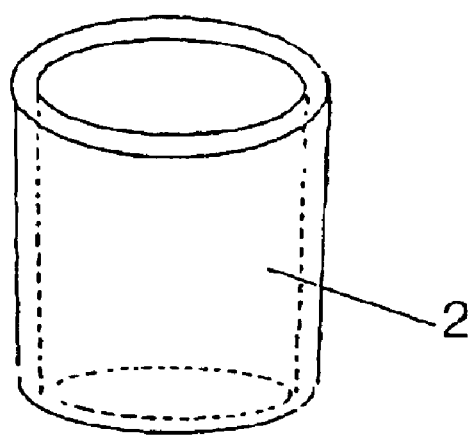
FIG. 3 is a perspective view of a cylindrical water purification filter of the present invention.

Then, there was made a mold for molding a cylinder 3 of 15 cm in outer diameter, 14.0 cm in inner diameter and 30 cm in length as shown in FIG. 3, to which the plastic CRB ceramics precursor was poured and pressmolded at a pressure of 22 Mpa. The mold temperature was 150° C.

The thus molded body was taken out of the mold die and subjected to a heat treatment by heating-up to 500° C. in a nitrogen atmosphere at a heat rising rate of 1° C. per minute and keeping at 500° C. for 60 minutes and then at 1,000° C. for about 120 minutes.

The molded body was then cooled at a cool down rate of 2 to 3° C. per minute down to 500° C., followed by natural heat dissipation under 500° C. to yield a molded product of CRB ceramics 2 as shown in FIG. 3. Properties of the water purification filter The molded product of CRB ceramics 1 showed an average pore diameter of 550 angstroms and a pore volume of 0.50 cm$^3$/g.

EXAMPLE 5

Preparation of CRB Ceramics Precursor

A defatted product of rice bran in an amount of 75-kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The carbonized material thus baked was ground by means of a grinder and screened through a 100-mesh screen to form a carbonized powder of 50 to 250 μm in particle diameter.

The carbonized powder thus obtained in an amount of 75 kg and a solid phenol resin (resol) in an amount of 25 kg were mixed and kneaded by heating at 100 to 150° C. to form a plastic and homogeneous mixture.

Preparation of a Fine Powder

The plastic mixture was then press-molded at a pressure of 20 Mpa to form a spherical body of 3 cm in diameter. The mold temperature was 150° C.

The thus molded body was taken out of the mold die and subjected to a heat treatment by heating-up to 500° C. in a nitrogen atmosphere at a heat rising rate of 1° C. per minute and keeping at 500° C. for 60 minutes and sintering at 950° C. for about 120 minutes.

The molded body was then cooled at a cool down rate of 2 to 3° C. per minute down to 500° C., followed by natural heat dissipation under 500° C.

Figure 4:
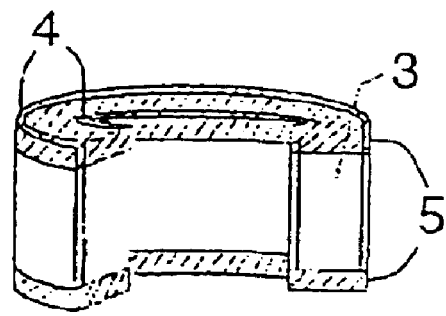
FIG. 4 is a sectional view of a cylindrical water purification filter of the present invention in which non-woven fabric or felt is used.

The sintered spherical body of 3 cm in diameter was ground by means of a grinder and further finely ground by means of a ball mill to form CRB ceramics fine particles of 5 to 10 $\mu$m in average particle diameter. Preparation of a water purification filter As shown in FIG. 4, CRB ceramics fine particles 3, of 7 $\mu$m in average particle diameter, were kept between nylon 6 non-woven fabric 4 having the properties of 5 $\mu$m in average particle diameter, 18 $\mu$m in maximum particle diameter, 6 cm$^3$/cm$^2$-second of gas permeability and 31 l/cm$^2$-minute-cm-H$_2$O of filtration discharge rate and the top and bottom ends thereof sealed with an adhesive 5.

Properties of the Water Purification Filter the CRB ceramics fine particles 3 showed an average particle diameter of 7 $\mu$m and a pore volume of 0.58 cm$^3$/g.

What is claimed is:

1. In a method of purifying water comprising a step of passing the water through a water purification filter, the improvement comprising the water purification filter comprising a filter element having a pore diameter of from 10 to 2,000 angstroms, a pore volume of from 0.1 to 1.1 cm$^3$/g and comprising an RB ceramic or a CRB ceramic, wherein the RB ceramic is formed from a carbonaceous material obtained by mixing degreased bran derived from rice bran with a thermosetting resin to form a mixture, kneading the mixture, pressure-molding the kneaded mixture to form a molded mixture, drying the molded mixture and baking the dried mixture in an inert gas atmosphere at a temperature of 700 to 1,000° C. and the CRB ceramic is formed by mixing the RB ceramic carbonaceous material with a thermosetting resin to form a second mixture, kneading the second mixture, pressure-molding the kneaded second mixture at a pressure of 20 to 30 MPa to form a molded second mixture and heat-treating the molded second mixture in an inert gas atmosphere at a temperature of 500 to 1100° C.

2. The method of claim 1, wherein the filter element is molded into a cylindrical form.

3. The method of claim 2, wherein the filter element comprises plural thin cylindrical filters fitted in order while altering a diameter of each cylindrical filter.

4. The method of claim 3, in which a zeolite fine powder or active carbon fine powder is filled between the cylindrical filters.

5. The method of claim 1, wherein the filter element is molded into a solid cylinder form.

6. The method of claim 1, wherein the filter element comprises RB ceramic or CRB ceramic fine powder having an average particle diameter of 1 to 500 $\mu$m, pore diameter of 10 to 2,000 angstroms and pore volume of 0.1 to 1.1 cm$^3$/g supported on a non-woven fabric.

7. The method of claim 6, additionally comprising an active carbon fine powder supported on the non-woven fabric.

8. The method of claim 7, wherein the weight ratio of the RB ceramic or CRB ceramic fine powder to the active carbon fine powder is 50 to 90:50 to 10.

9. The method of claim 6, wherein the non-woven fabric has an average pore diameter of from 1 to 30 $\mu$m and a maximum pore diameter of no more than 80 $\mu$m and a pure water filtration discharge rate of at least 3 l/m$^2$·minute at a differential pressure of 1 cm-H$_2$O.

* * * * *